Sept. 26, 1967  R. G. DOERFLING  3,343,645
ROTARY WORK STATION CONVEYOR
Filed Nov. 2, 1966  5 Sheets-Sheet 1

FIG. 1.

FIG. 6.

INVENTOR.
Ralph G. Doerfling
BY
Harness, Dickey & Pierce
ATTORNEYS

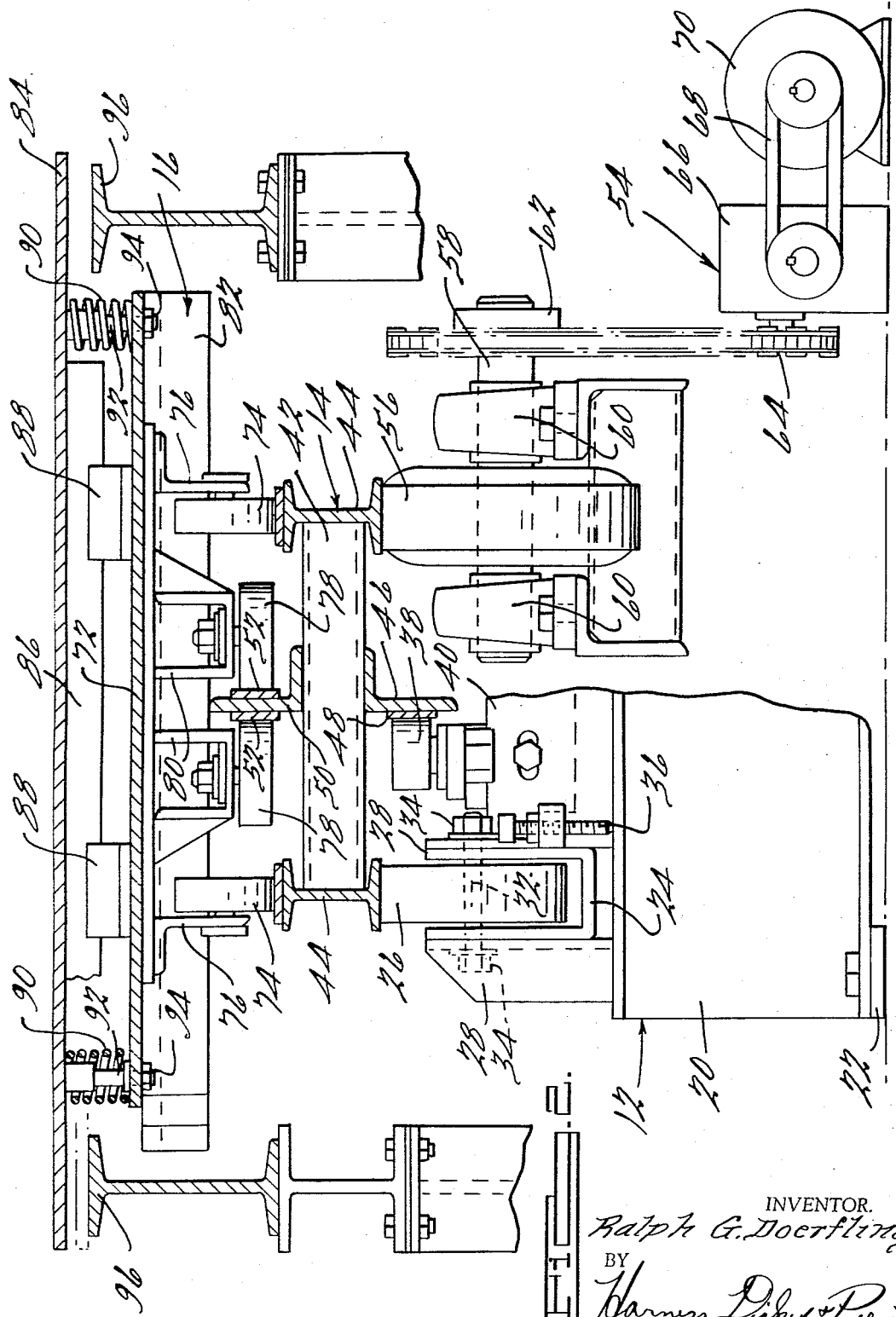

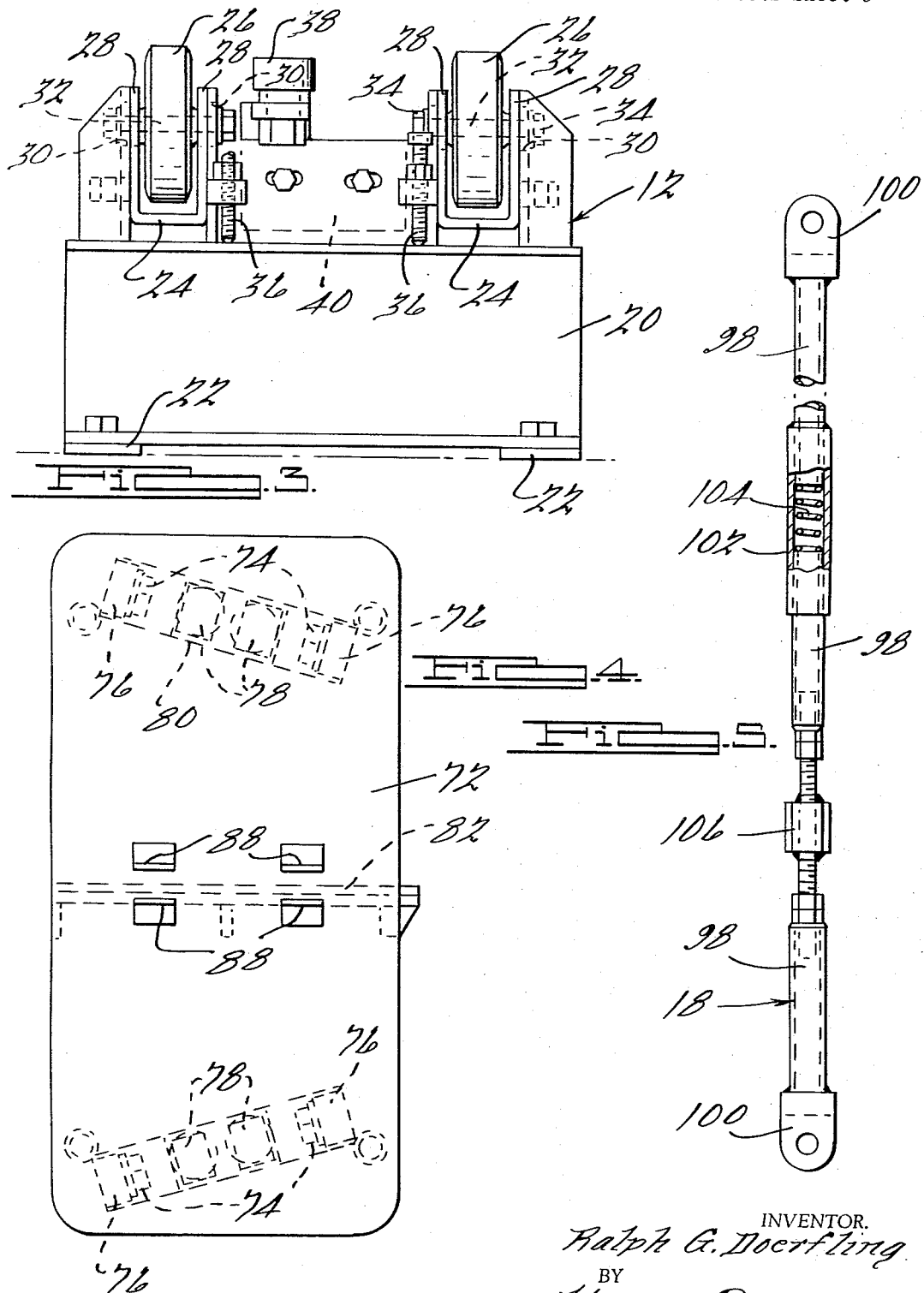

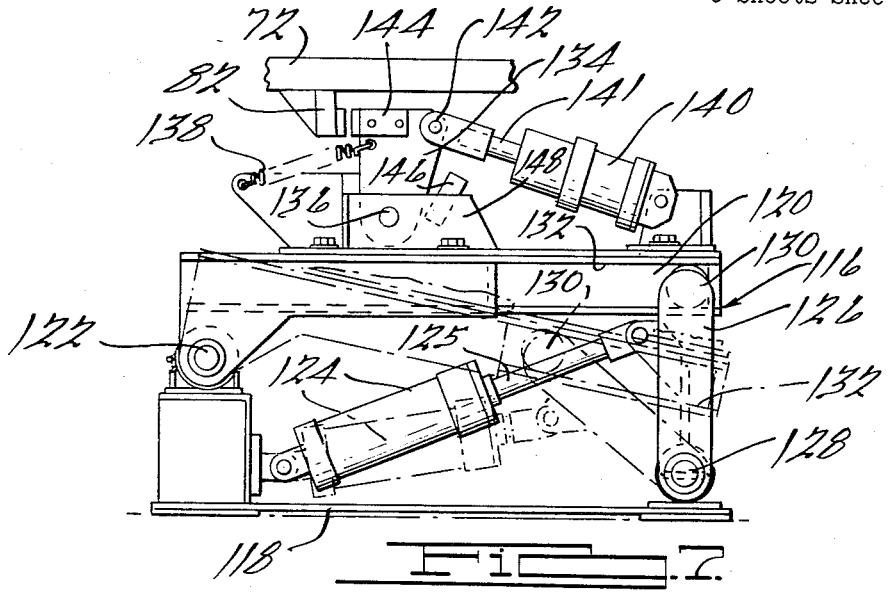
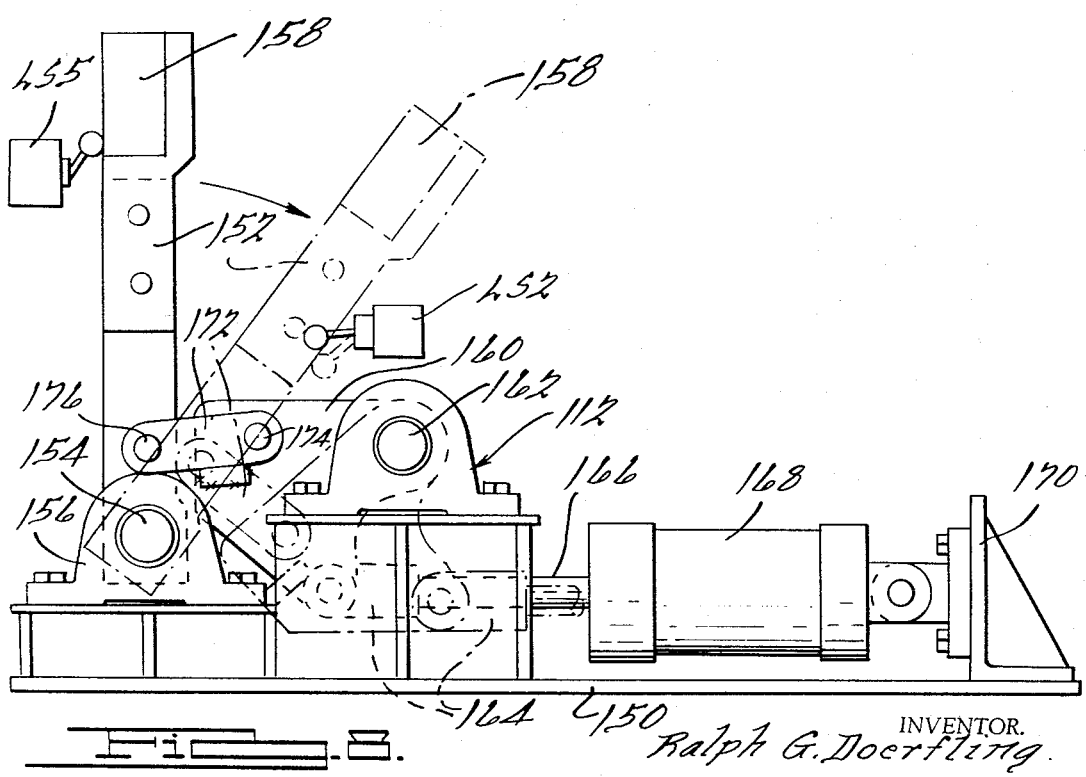

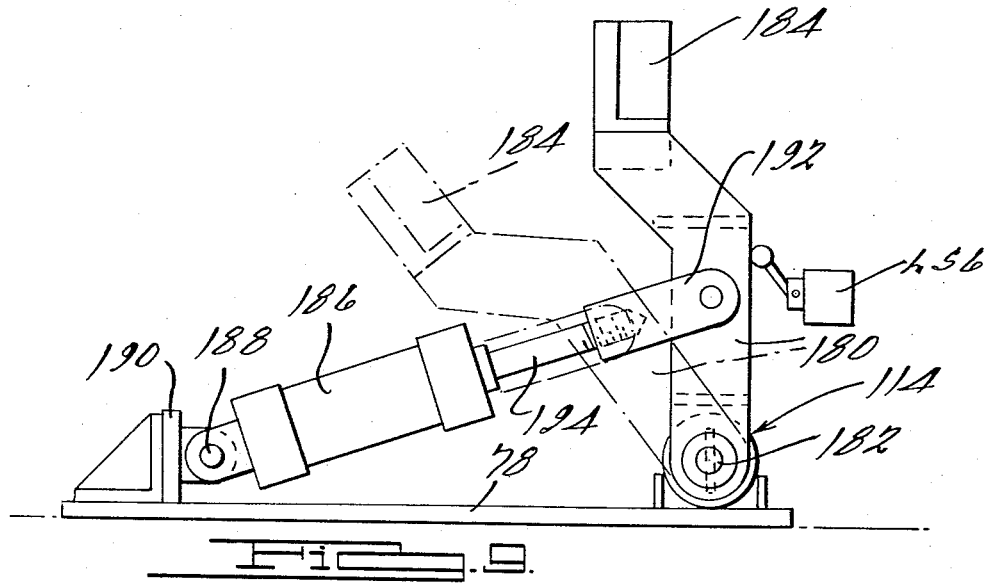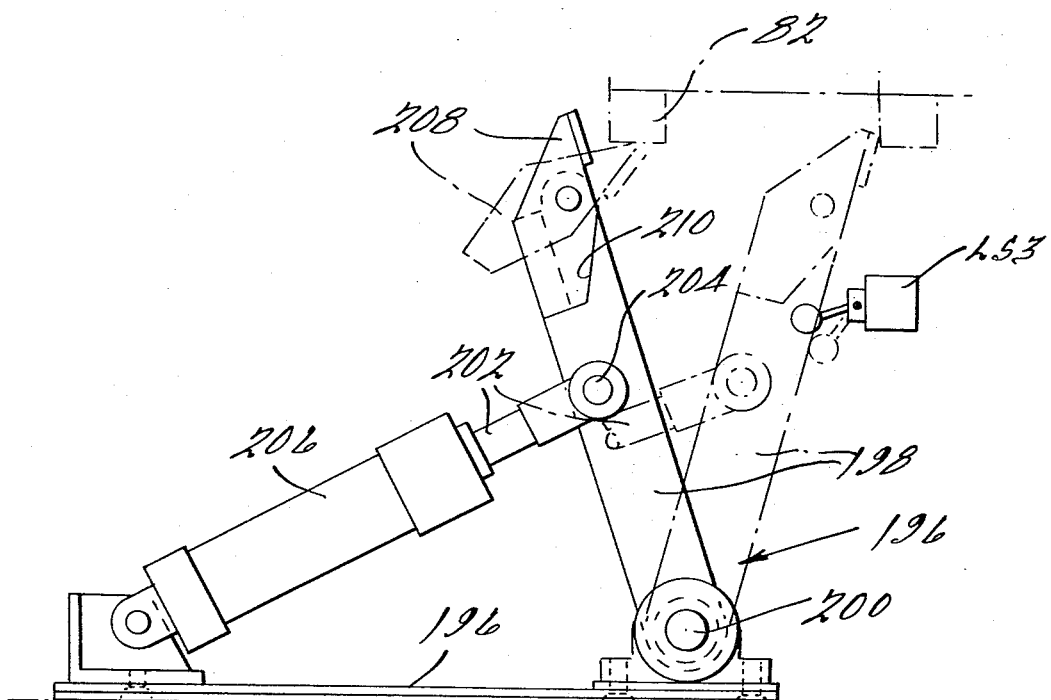

United States Patent Office

3,343,645
Patented Sept. 26, 1967

3,343,645
ROTARY WORK STATION CONVEYOR
Ralph G. Doerfling, Walled Lake, Mich., assignor to Detroit Gasket and Manufacturing Company, a corporation of Michigan
Filed Nov. 2, 1966, Ser. No. 591,593
10 Claims. (Cl. 198—19)

The present invention broadly relates to a novel processing machine, and more particularly, to a transfer machine which is adapted to automatically transfer materials and associated jigs and fixtures through a series of spaced work stations at which a work operation is performed thereon. More specifically, the present invention is directed to an automatic transfer machine for transferring work materials in a closed circular path through a series of circumferentially spaced work stations at which the materials are retained in a stationary condition for a preselected time interval to enable the performance of the requisite work operation thereon.

A variety of processing machines of the general type to which the present invention is applicable are in widespread commercial use for providing an automatic transfer of work materials and associated jigs and fixtures through a plurality of work stations at which various work operations are performed. In order to transfer work materials which are of a substantial weight, is has heretofore been necessary in machines of the types known, to provide a relatively complex and cumbersome structure to provide the requisite support of the materials at each work station, as well as during their travel therebetween. In such situations, the mass of the material being transferred has necessitated relatively long transfer periods and the inertia effects of the material being moved has prevented accurate indexing of the materials at the work station substantially detracting from the efficiency of the operation.

It is, accordingly, a principal object of the present invention to provide an improved processing machine which overcomes the problems and disadvantages of processing machines of the types heretofore known.

Another object of the present invention is to provide a novel processing machine which is of a relatively compact, simple and light-weight structure, substantially increasing the versatility and flexibility of the installation and use of such machines.

Still another object of the present invention is to provide a novel processing machine which provides for accurate registration of the work materials and associated jigs and fixtures relative to each work station, assuring proper alignment of the operating tools relative to the work material.

A further object of the present invention is to provide an improved processing machine including a transfer system which minimizes the inertia associated with the transfer movement of the work materials from a stationary position at one station to the next adjoining work station, providing therewith a substantial reduction in the transfer time required and a corresponding increase in the efficiency of the machine.

A still further object of the present invention is to provide a novel processing machine which is readily adaptable for automatic operation, is of economical and simple manufacture and is of reliable and durable operation.

The foregoing and other objects and advantages of the present invention are achieved by a processing machine comprising a framework on which a circular track is movably mounted and is rotatably driven in a continuous manner. A plurality of work carts are movably supported on the circular track and are interconnected at circumferentially-spaced intervals corresponding to the intervals of the work stations disposed adjacent to the circular track. Pusher means are provided for effecting an initial acceleration of the work carts from a stationary position to a speed corresponding substantially to that of the speed of rotation of the track, and suitable cushioning means are provided for engaging and decelerating the work carts when they approach the next adjacent work station. Engaging means are provided for engaging and fixedly holding the carts in appropriate registered relationship relative to each of the work stations to enable the performance of a work operation on the material carried thereon. The operation of the machine and the components thereof are coordinated by suitable control means for providing a preselected sequentially phased operation thereof and a transfer of the work carts between the stations at the preselected time intervals.

Other objects and advantages of the present invention will become apparent upon a reading of the following specification, taken in conjunction with the accompanying drawings, wherein:

FIGURE 1 is a plan view of a conveying machine incorporating the preferred embodiments of the present invention;
FIGURE 2 is a typical transverse sectional view through the conveying machine shown in FIGURE 1;
FIGURE 3 is an enlarged front elevational view of a roller support comprising the supporting framework of the processing machine;
FIGURE 4 is a plan view of a pallet plate comprising the base portion of a work cart;
FIGURE 5 is an enlarged plan view of a connecting link extending between work carts incorporating shock-absorbing means therein;
FIGURE 6 is an enlarged fragmentary plan view of a typical bracket affixed to the ends of each work cart to which the connecting links are attached, and which are adapted to be engaged by locating devices for retaining the work carts in appropriate indexed relationship relative to the work stations;
FIGURE 7 is a side elevational view of a cushion stop assembly for decelerating the work carts upon approaching a work station;
FIGURE 8 is a side elevational view of an engaging-device for locating the forward porton of a work cart relative to a work station;
FIGURE 9 is a side elevational view of an engaging device for locating the rearward portion of a work cart relative to a work station; and
FIGURE 10 is a side elevational view of a pusher assembly for initiating circumferential movement of the work carts between stations.

Referring now in detail to the drawings, and as may be best seen in FIGURES 1 and 2, the processing machine comprising the present invention includes a framework consisting of a series of roller support assemblies 12 disposed in circumferentially-spaced relationship on which a circular supporting track 14 is rotatably mounted. A plurality of work carts 16 are removably mounted on the circular supporting track 14 and are interconnected by drag links 18. Suitable work materials, including associated jigs, fixtures, tools, etc., are adapted to be positioned in appropriate relationship on the upper surfaces of each of the work carts 16, enabling the performance of a work operation thereon as the carts are transferred from one station to the next adjoining station.

In the exemplary processing machine as illustrated in FIGURE 1, three work carts 16 are employed, but it will be understood that two, four, or more work carts can be employed consistent with the nature of the material being processed and the number of work stations desired. The exemplary machine disclosed is particularly applicable for processing floor covering materials in accordance with the method as disclosed in United States patent application Ser. No. 573,307, filed Aug. 18, 1966, for "Method of Making Contoured Carpeting," which is assigned to the same assignee as the present invention. The method as described in the aforementioned United States patent application pertains to the fabrication of composite contoured carpeting materials which are particularly suitable for use in covering the floor of passenger automobiles. For this purpose, a carpeting material incorporating a heat-softenable material on the back surface thereof, such as a thermoplastic resin, for example, is positioned with the pile surface thereof downwardly over a female die, which is adapted to be positioned in appropriate registration on the upper surface of a work cart 16. The positioning of the carpeting material on the cart can conveniently be done at the load-unload station, as indicated in FIGURE 1 of the drawings. The carpet material thereafter is transferred by the cart to a preheat station, as indicated in FIGURE 1, at which the coating is heat softened and whereafter the cart is moved to the molding station, wherein a suitable resilient pad is placed against the heat-softened coating on the carpeting material, and the male portion of a die is moved downwardly, effecting concurrent adherence of the pad material to the carpet material and a contouring thereof. When the heat-softenable coating has cooled sufficiently to retain the contour of the mold surface, the die or press is opened and the cart is again advanced to the load-unload station, at which the completed carpet is removed and a new piece of carpeting material is installed on the lower mold half. The foregoing method is typical of any one of a variety of processing sequences that can be automatically and efficiently performed by the processing machine comprising the present invention.

Each of the elements comprising the structure of the processing machine will now be described in detail commencing with the roller support assemblies 12, as best seen in FIGURES 1, 2 and 3. As shown in the drawings, the roller assembly comprises a transversely extending beam 20, which is of an I-shaped cross section, having mounting pads 22 affixed to each of the lower ends thereof for securing the roller assembly in appropriate relationship to a platform or floor on which the machine is mounted. A pair of U-shaped brackets 24 are attached to the upper surface of the beam 20 and between the upstanding leg portions of which support rollers 26 are rotatably mounted. Each U-shaped bracket 24 is disposed between upright members 28, having elongated slots 30 therethrough, through which the threaded ends of the shaft 32 of the support roller 26 extends and are secured by means of nuts 34. The foregoing construction enables appropriate vertical positioning of the U-shaped brackets and the support rollers by means of adjusting screws 36, which are disposed with the lower ends of their shanks in abutting relationship against the upper surface of the beam 20.

Disposed between the support rollers 26 is a guide roller 38, which is mounted on a transversely-adjustable plate 40. The guide roller 38 is rotatable about a vertical axis and is adapted to provide radial guidance of the circular supporting track 14.

The circular track 14, as best seen in FIGURES 1 and 2, comprises a series of cross beams 42 to the ends of which circular supporting rails 44 are affixed, which are disposed in substantially parallel and concentric relationship. Each rail 44 is of an I-shaped cross section and the lower face of the bottom flange thereof is adapted to be disposed in rolling supporting relationship on the support rollers 26 of the roller assemblies. A circular guide rail 46, which is of an L-shaped cross section, is affixed to the bottom central portion of the cross beams 42 and extends in concentric relationship relative to the supporting rails 44. The inner surface of the guide rail 46 is preferably provided with a rim 48, which is adapted to be disposed in bearing contact against the peripheral surface of the guide roller 38 of each roller assembly.

A similar guide rail 50 is affixed to the upper portion of the cross beams and extends in a continuous concentric manner and is provided with rims 52 on opposite faces of the upstanding web thereof. The upper guide rail 50 serves the purpose of providing radial guidance of the work carts 16 movably mounted on the circular supporting track in a manner as shown in FIGURE 2.

Rotation of the circular supporting track 14 in a continuous manner and in a clockwise direction, as viewed in FIGURE 1, is achieved by a drive assembly 54, as best seen in FIGURES 1 and 2, comprising a pneumatic drive wheel 56 which, as best seen in FIGURE 2, is disposed with the periphery thereof in frictional bearing contact against the lower surface of the outer supporting rail 44. The drive wheel 56 is mounted on a drive shaft 58, which is rotatably supported by pillow blocks 60. A suitable pulley or driven socket 62 is affixed to one end of the drive shaft 58 and is coupled to a drive sprocket 64 affixed to the output side of a variable speed reducer 66. The speed reducer in turn is drivingly coupled, such as by means of a belt or roller chain 68, to a constant-speed electric drive motor 70, as best seen in FIGURE 2. In accordance with this arrangement, the circular supporting track 14 is rotated in a continuous manner while movably supported on the roller assemblies. The particular speed of rotation will vary depending on the weight of the work carts 16 and the distances between adjacent work stations so as to provide optimum efficiency of operation. Speeds within a range from about 70 feet per minute up to about 200 feet per minute have been found satisfactory in connection with the fabrication of contoured carpeting materials in a manner as hereinbefore described.

Each work cart 16 comprises a base plate 72, to the undersurface of which a series of support and guide rollers are rotatably mounted, as may be best seen in FIGURES 2 and 4. A total of four support rollers 74 are rotatably mounted on angle brackets 76 and are adapted to be positioned in rolling bearing contact on the upper surface of the supporting rails 44. Two pairs of guide rollers 78 are rotatably mounted on U-shaped brackets 80, and are disposed so that the peripheral surfaces thereof are in rolling bearing contact against the rims 52 of the upper guide rail 50. The coaction between the support rollers 74 and guide rollers 78 with the circular supporting track assembly 14 serves to maintain each work in appropriate alignment at all times.

To the underside of the base plate 72, a cross member 82 is rigidly affixed at substantially the center thereof, as illustrated in the drawings, for the purposes of providing engagement by a cushioned stop assembly and a pusher mechanism in a manner subsequently to be described. In accordance with a preferred construction of the work cart 16, a work platform 84 is resiliently supported on the base plate 72 and is of a size greater than the base plate overhanging the side and end edges thereof, as is best seen in FIGURES 1 and 2. Appropriate longitudinal alignment between the base plate 72 and the work platform 84 is achieved by a transversely extending web 86 affixed to and depending from the underside of the work platform 84, which is disposed with the side surfaces thereof in sliding bearing contact against two pairs of spaced-apart brackets 88 affixed to and projecting upwardly from the upper surface of the base plate. This arrangement enables the work platform 84 to move downwardly toward the base plate in opposition to the upward biasing force of a series of coil springs 90 disposed between the lower surface of the work platform and the upper surface of the base plate as best seen in FIGURE 2. Each of the coil springs 90 is disposed around a guide pin 92, having its upper end affixed to the work platform and its lower end extending through an aperture formed in the base plate. A suitable head, such as a nut 94, is affixed to the projecting end of the guide pin to restrict further movement of the two members apart beyond the position as shown in solid lines in FIGURE 2.

The provision of a resiliently biased work platform is particularly desirable when a work operation is to be performed on materials positioned on the upper surface of the work platform necessitating the application of large downward forces on the work cart. In such instances and at such work stations, suitable backup rails 96, as best seen in FIGURE 2, are provided which are adapted to receive the extending edge portions of the work platform 84 as a result of its downward movement under pressure, such as the pressure applied by means of a press, effecting a compression of the coil springs 90 until the work platform is entirely supported by the back-up rails. The further application of pressure after the work platform has become seated against the upper surfaces of the backup rails does not impose any appreciable downward force on the circular supporting track, enabling continued movement thereof by the drive assembly 54.

Each of the work carts is interconnected by the drag links 18, as shown in FIGURE 1, which incorporate shock-absorbing means of the type as best seen in FIGURE 5. The drag link 18, as shown in FIGURE 5, comprises a pair of tubes 98 having a clevis-type fitting 100 affixed to each of the ends thereof. A tubular sleeve 102 is rigidly affixed to one tube, such as by welding, and extends in overlying sliding relationship around the end of the adjacent tube 98. A compression coil spring 104 is disposed within a tubular sleeve 102 and with the ends thereof abutting the opposed ends of the tube 98, providing for resilient telescoping movement of the tubes 98 relative to each other, enabling the absorption of shock as encountered during rapid acceleration or deceleration of the work carts. In the drag link illustrated in FIGURE 5, an adjustable turnbuckle 106 is provided in one of the tubes 98, enabling adjustment of the overall length of the drag link to provide proper tension between each of the links and the carts connected thereto.

The clevis fittings 100 of each of the drag links 18 are pivotally connected to end brackets 108 affixed to the forward and rearward edges of the work platform 84 of each work cart. As best seen in FIGURES 1 and 6, the end bracket 108 is provided with a V-shaped slot 110, which is adapted to be engaged by a front locator assembly 112 and a rear locator assembly 114 positioned at the molding station, as best seen in FIGURE 1, for accurately indexing the work cart relative to suitable tooling, such as a press, at the molding station. The stoppage of the carriages from a traveling speed corresponding substantially to that of the rotating speed of the circular supporting track is achieved by a cushion assembly 116, which in the typical arrangement shown in FIGURE 1 is located at the molding station and is operative to effect a rapid deceleration of the work carts as they approach the work stations. The cushioning characteristics of the cushion assembly 116 in combination with the cushioning characteristics of the drag links 18 serve to reduce the jar or shock occasioned by rapid deceleration of the work carts.

The cushion assembly 116, as is best seen in FIGURES 1 and 7, comprises a mounting plate 118, to one end of which an arm 120 is pivotally connected by means of pivot pin 122, enabling pivoting movement thereof to and from a raised position as shown in solid lines in FIGURE 7 to a lowered position as shown in phantom. Movement of the arm 120 between the two positions is achieved by a double-acting fluid-actuated cylinder 124, which has the end of its piston rod 125 pivotally connected to an arm 126 pivotally mounted on pivot pin 128. A pair of rollers 130 are rotatably mounted at the upper end of the arm 126, which are adapted to roll within channel-shaped rails 132 formed on each side of the arm 120, effecting pivoting movement thereof to and from the raised position and lowered position. A shock absorber assembly is mounted on the upper surface of the arm 120 comprising a cam 134 pivotally mounted about pivot pin 136 having one edge thereof connected to a tension spring 138 for biasing the cam in a counterclockwise direction as viewed in FIGURE 7. A shock-absorbing cylinder 140 is mounted on the opposite side of the tension spring 138, having the end of its piston rod 141 pivotally connected by means of a pin 142 to the opposite side of the cam 134.

The upper leading edge of the cam 134 is provided with an abutment shoe 144, which is adapted to engage the leading edge of the cross member 82, fragmentarily shown in FIGURE 7, on the lower portion of a work cart upon its movement toward the work station. The momentum of the work cart causes elongation of the tension spring 138 and a compression of the shock-absorbing cylinder 140, effecting a slow-down of the cart during a relatively short travel distance, such as six inches, for example. Pivoting movement of the cam 134 in a clockwise direction is restricted by a stop member 146 affixed to a bracket 148. The stop member is adapted to contact the rearward or trailing edge of the cam member preventing further clockwise pivoting movement thereof beyond a preselected angularity.

Accurate location of the front edge of the work cart relative to the mold station is achieved by the front locator assembly 112, as best seen in FIGURES 1 and 8, which comprises a base 150 on which an engaging arm 152 is pivotally mounted on a pivot shaft 154 rotatably supported between pillow blocks 156. The upper end portion of the engaging arm 152 is formed with a V-shaped shoe 158, which is adapted to engage and become disposed in the complementarily shaped V-shaped slot 110 of the forward end bracket 108 on the work cart. Pivoting movement of the engaging arm 152 from an engaging position, as shown in solid lines in FIGURE 8, to a non-engaging position in which it is disposed in clearance relationship beneath a work cart, as shown in phantom, is achieved by means of a bellcrank 160, pivotally mounted on a shaft 162, which is connected by means of a clevis assembly 164 to a piston rod 166 of a double-acting fluid-actuated cylinder 168, having its blank end pivotally mounted to an upstanding bracket 170 affixed to the base 150. A link 172 is pivotally connected by means of a pin 174 to the bellcrank 160 and by a pin 176 to the lower portion of the engaging arm 152.

Appropriate location of the rear portion of a work cart relative to the mold station is achieved in a similar manner by means of rear locator assembly 114, as best seen in FIGURES 1 and 9, which comprises a base 178 on which an engaging arm 180 is pivotally mounted by means of pivot shaft 182. The upper end portion of the engaging arm 180 is formed with a V-shaped shoe 184, which is adapted to be disposed in the complementarily V-shaped slot 110 in the rearward end bracket 108 on the work cart, effecting retention thereof in appropriate position relative to the work station. Movement of the engaging arm 180 from an engaging position, as shown in solid lines in FIGURE 9, to a non-engaging position in which it is disposed in clearance relationship below the work cart, as illustrated in phantom in FIGURE 9, is achieved by means of a double-acting fluid-actuated cylinder 186 having its blank end pivotally mounted by means of a pin 188 to a bracket 190 affixed to the base 178 and by a clevis fitting 192 affixed to the end of its piston rod 194, which is attached to an intermediate portion of the engaging arm.

It will be apparent from the foregoing that the cushion assembly 116 is effective to achieve rapid deceleration of the work carts as they approach a work station, while the front and rear locator assemblies 112, 114, respectively, are effective to retain the work carts in proper registration relative to each of the work stations during the performance of a work operation in spite of the continued movement of the circular supporting track. At the completion of the performance of a work operation, rapid acceleration of the work carts to a speed approaching that of the circular track is achieved by a pusher mechanism 196, as best seen in FIGURES 1 and 10. As shown in FIGURE 10, the pusher assembly comprises a base 196, on which a pusher lever 198 is pivotally mounted by means of a pivot pin 200. The end of a piston rod 202 is pivotally connected to an intermediate portion of the pusher lever by means of pin 204 and is operative to effect pivoting movement of the pusher lever in response to introduction of fluid into the cylinder 206 from a retracted position, as shown in solid lines in FIGURES 10, to a projected position, as shown in phantom.

The upper end portion of the pusher lever 198 is provided with a pivotally mounted pusher 208, which is adapted to pivot from an engaging position, as shown in solid lines in FIGURE 10, to a non-engaging position, as shown in phantom, in response to retraction of the lever and contact with the cross member 82 affixed to the underside of a work cart. Upon passage of the cross member 82 to a position forwardly of the pusher lever, the pusher 208, through the action of gravity, pivots to an engaging position in which position it is effective to engage and rapidly accelerate the work carts during the next advancing stroke thereof. The pusher 208 and the upper end of the pusher lever 198 are suitably notched as at 210, preventing pivoting movement of the pusher in a counterclockwise direction beyond the position as shown in solid lines in FIGURE 10. The speed of actuation of the cylinder 206 and the length of the pivoting stroke of the pusher lever 198 are preferably controlled so that the three interconnected work carts are rapidly accelerated to a speed approaching that of the speed of the circular supporting track, whereupon further transfer of the work carts is achieved at a rate established by the speed of rotation of the circular track. In many instances it has been found that after only a relatively short angular movement of the work carts during the initiation of the transfer movement, a speed corresponding to that of the rotation of the circular track is attained such that the support rollers 74 on the underside thereof are stationary during the remaining portion of the transfer movement.

In operation, the processing machine is readily adaptable to automatic control employing suitable sensing means, such as limit switches, for example, for sensing the disposition of the several components, providing therewith an integrated sequentially-phased operating cycle. The sensing means on limit switches are interconnected to a central control system in a manner well-known in the art and are operative through suitable solenoid valves to control the flow of pressurized fluid to and from the several actuating cylinders. The initiation of a work cycle is accomplished by suitable sensing or actuating means located at one station, which is effective to communicate to the central control circuit that the work operation has been completed. In the examplary arrangement as illustrated in FIGURE 1, and with the machine employed for making contoured carpeting materials in accordance with the method as disclosed in the aforementioned United States patent application, the sensing means may comprise a limit switch such as limit switch LS1, schematically illustrated in FIGURE 1, which is adapted to be tripped in response to the opening of the mold and in response to the ascending movement of the upper mold half. In response to the tripping of limit switch LS1, a pressurized fluid is transmitted to the rod end of the cylinder 168 of the front locator assembly 112 (FIGURE 8), effecting a movement of the engaging arm from the engaging position as shown in solid lines to the non-engaging position as shown in phantom and to the rod end of the cylinder 186 of the rear locator assembly 114 (FIGURE 9), effecting a retraction of the engaging arm thereof from the engaging position as shown in solid lines to a non-engaging position as shown in phantom. When the front locator assembly attains the retracted position, the engaging arm 152 thereof trips a limit switch LS2, as schematically illustrated in FIGURE 8, which in turn communicates to the central control circuit that the work carts are in condition to be transferred. Accordingly, in response to the tripping of limit switch LS2, pressurized fluid is transmitted to the rod end of cylinder 206 of the pusher assembly (FIGURE 10), whereupon the pusher arm thereof moves from the retracted position as shown in solid lines to the projected position effecting a corresponding acceleration of the work carts to a speed approaching that of the circular track. When the pusher lever 198 attains the fully projected position, it trips limit switch LS3, as schematically illustrated in FIGURE 10, which effects an energization of the cylinder 124 of the cushion assembly 116 (FIGURE 7), which moves from the retracted position as shown in phantom to the engaging positions as shown in solid lines.

The work carts continue to travel in their rotating path until they approach the work stations, at which time the cross member 82 on the underside of the work cart engages the abutment shoe 144 of the cushion assembly, effecting a rapid deceleration of the work carts. During the decelerating movement of the work carts as they approach proper alignment with the work stations, a station limit switch such as limit switch LS4, schematically illustrated in FIGURE 1, is tripped by the work cart, which in turn effects energization of the cylinders of a front and rear locator assembly, resulting in the movement of the engaging arms thereof to a raised engaging position, wherein the V-shaped engaging members thereon are disposed in engaging contact with the V-shaped slots in the end brackets of the work carts as illustrated in FIGURE 1.

When the engaging arm of the front locator assembly attains the engaging position as shown in solid lines in FIGURE 8, and the engaging arm of the rear locator assembly attains the engaging position as shown in solid lines in FIGURE 9, limit switches LS5 and LS6, respectively, are tripped which signal the central control circuit of the machine that the front and rear locators are in proper position and that the work cart is in registration at the mold station (FIGURE 1). The tripping of limit switches LS5 and LS6 effects a retraction of the cushion assembly (FIGURE 7) to the lowered clearance position and the pusher assembly (FIGURE 10) from the advanced position to the retracted position. The tripping of limit switches LS5 and LS6 can also serve to effect energization of the tool such as the upper mold half of a press located at the molding station shown in FIGURE 1, whereupon the upper mold half commences its downward movement. Similarly, the tripping of limit switches LS5 and LS6 is effective to energize suitable heating devices at the preheat station of the processing machine shown in FIGURE 1. At the completion of a preselected dwell period, which may be controlled by a suitable timer incorporated in the central control circuit, the press at the molding station is opened, whereupon a tripping of limit switch LS1 again occurs and whereupon the processing machine effects a transfer of the work carts to the next adjacent station in accordance with the sequence as hereinabove set forth.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. A processing machine for transferring materials through a plurality of work stations comprising a framework, circular track means on said framework, means for rotatably supporting said track means, drive means for continuously rotating said track means, a plurality of work carts movably supported on said track means, connecting means interconnecting said work carts for maintaining them in appropriate circumferentially-spaced relationship, and stop means for periodically engaging the said work carts and retaining them in stationary relationship for a preselected interval at selected circumferentially-spaced stations.

2. The processing machine as described in claim 1 wherein said stop means includes cushioning means for decelerating said work carts as they approach a work station.

3. The processing machine as described in claim 1 wherein said connecting means includes means effecting a controlled expansion and contraction thereof for absorbing at least a portion of the accelerating and decelerating forces imposed on said work carts.

4. The processing machine as described in claim 1 further including engaging means disposed at least at one of the work stations for retaining said work carts in a fixed position relative to the work stations.

5. The processing machine as described in claim 1 further including pusher means for accelerating said work carts from a stationary position to a speed approaching that of said circular track means.

6. The processing machine as described in claim 1 wherein each of said work carts includes roller means disposed in rolling bearing contact on a pair of spaced-apart concentric rail means incorporated on said circular track means.

7. The processing machine as described in claim 1 wherein said drive means comprise a driven wheel disposed in frictional driving engagement with said circular track means.

8. The processing machine as described in claim 3 wherein said engaging means is disposed at a work station and is operative to engage coacting means located at the forward and rearward ends of a work cart preventing inadvertent movement thereof.

9. The processing machine as described in claim 1 further including sensing means for actuating and de-actuating said stop means.

10. The processing machine as described in claim 6 wherein each of said work carts includes a resiliently mounted work platform on which work material is positioned, said platform movable downwardly in response to pressure applied to the upper surface thereof, and means on said framework for engaging and supporting said platform when in a downward moved position thereof.

References Cited

UNITED STATES PATENTS 2,327,068   8/1943   Rylander _____ 198—19

EVON C. BLUNK, *Primary Examiner.*

EDWARD A. SROKA, *Examiner.*